United States Patent

[11] 3,565,061

| [72] | Inventor | Verne J. Reynolds |
| | | 148 E. Jefferson, Boise, Idaho 83702 |
| [21] | Appl. No. | 820,384 |
| [22] | Filed | Apr. 30, 1969 |
| [45] | Patented | Feb. 23, 1971 |

[54] FREE SLIDING BIVALVE VAGINAL SPECULUM
5 Claims, 4 Drawing Figs.

| [52] | U.S. Cl.......................................... | 128/20; 128/345 |
| [51] | Int. Cl......................................... | A61b 1/30, A61b 1/32, A61m 29/00 |
| [50] | Field of Search................................. | 128/3, 4, 17, 20, 341, 345 |

[56] References Cited

UNITED STATES PATENTS

| 351,548 | 10/1886 | Watson | 128/17 |
| 559,122 | 4/1896 | Daily | 128/3UX |
| 997,823 | 7/1911 | Humphreys | 128/20 |
| 1,217,745 | 2/1917 | Gracey | 128/20 |
| 2,300,040 | 10/1942 | Betts | 128/3 |

Primary Examiner—Richard A. Gaudet
Assistant Examiner—Channing L. Pace
Attorney—Jones & Lockwood ABSTRACT: There are two cooperating members, a lower member and an upper member, both made of suitable plastic material. The lower member has a concave upwardly facing arcuate handle portion of a radius of about 4 inches. At its upper end is an integral shank of about twice the width of the handle and concave in cross section with the concave portion facing upwardly and projecting on out from the end of the shank portion in an arcuate right angle. This projecting end portion is a tongue portion that is bifurcated and also concave and facing upwardly. The handle of the lower member has sides that extend up and inwardly and form a channel within which is slidingly received the handle of a correspondingly shaped upper member having like parts except that the shank at the upper end of the handle is longer and has an elongated relatively large aperture therethrough providing a view and access for preparation instruments and between the spaced apart tongues. The upper member shank is concave facing downwardly as is its bifurcated projecting tongue. The lower member handle has an integral downwardly extending finger engaging abutment at its lower end. The upper member handle has an integral curved upwardly thumb engaging abutment at its lower end.

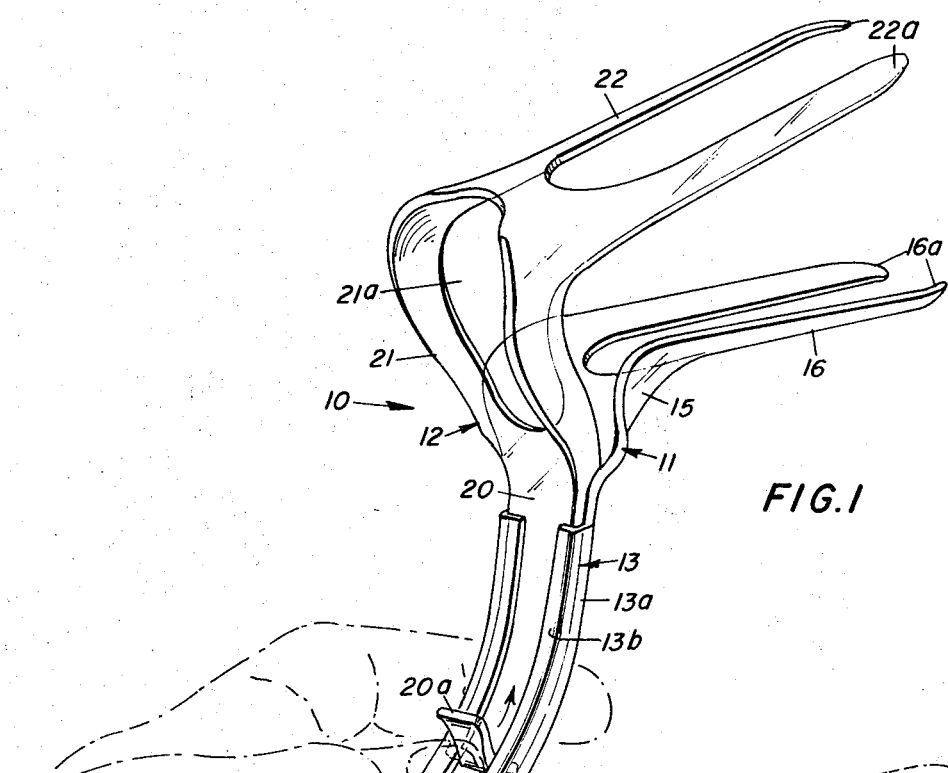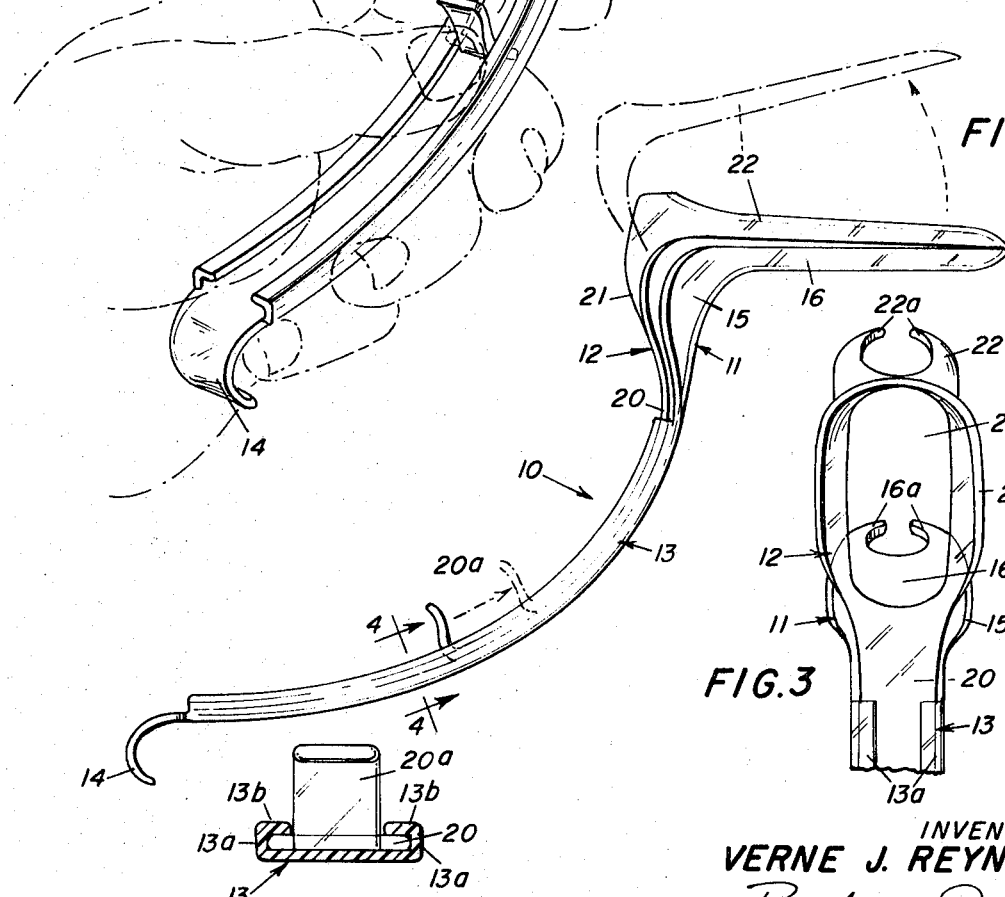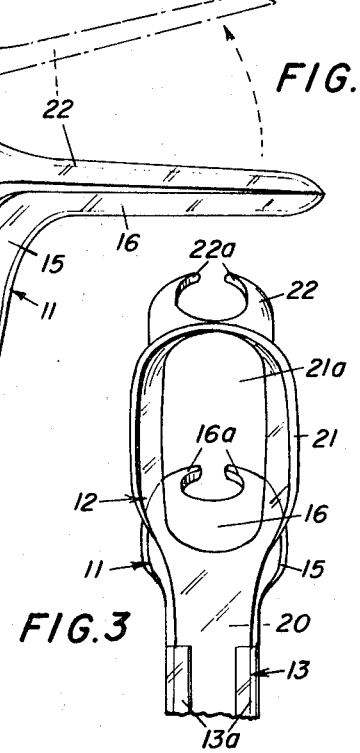
PATENTED FEB23 1971  3,565,061
FIG.1
FIG.2
FIG.3
FIG.4
INVENTOR
VERNE J. REYNOLDS
BY Blair and Jones
ATTORNEYS

FREE SLIDING BIVALVE VAGINAL SPECULUM

It is an object of this invention to provide a vaginal speculum that is held in one hand of the operator and slidably operable by that hand from a closed position of its projecting tongues to a spread apart position where they are about 1 ⅜ inches apart at their proximal ends and about 2 inches apart at their distal ends.

A further object of the invention is to provide a vaginal speculum that is manipulated by one hand of the operator, thus leaving the other free and has a relatively wide aperture in the upper end of the upper member providing an inspection and access opening for passage of operating preparation instruments therethrough.

Another object of the invention is to provide a slidable type of speculum that has ease of sliding yet affords great stability in the sliding handle engagement of the upper and lower members each of which are integral.

Yet another object of the invention is to provide a vaginal speculum having handles that are relatively long and having a radius of about 4 inches so that the hand of the operator holding the speculum is kept away from the patient.

A further object of the invention is to provide in a speculum of this type tongues that are bifurcated so as to allow greater exposure of the vaginal membrane prepared for an operation.

For a more complete understanding of the nature and scope of the invention, reference is had to the drawings, the description and the claims which follow. In the drawings:

FIG. 1 is a perspective view of the speculum with the left hand of the operator sliding the upper member upwardly by engagement by his thumb to spread apart the tongues;

FIG. 2 is a side elevation showing in full lines the position of the tongues closed and the respective position of the upper handle slid to extreme down position;

FIG. 3 is a view from the rear as seen in FIG. 1 through the relatively large elongated aperture in the shank of the upper member on through to the spread apart bifurcated tongues; and FIG. 4 is a cross-sectional view along line 4—4 on the handle portions in FIG. 2 and showing the upstanding abutment on the lower end of the upper handle portion.

Throughout the description, like reference numbers refer to similar parts.

The free sliding bivalve vaginal speculum is generally indicated at 10. It is formed of plastic that is light weight yet sturdy in construction.

There is a lower member generally indicated at 11 and an upper slidingly cooperating member 12.

The lower member 11 has an upwardly facing throughout its length concave shaped handle 13 having a radius of about 4 inches and is about 7 inches in length. The curved handle 13 has upturned sides 13a and inwardly projecting lips 13b at the top of the sides and thereby forming a recessed trackway within which is slidably received the handle 20 the upper member 12 to be described. The lower end of handle 13 has an arcuate downwardly turned abutment 14 for engagement by the little finger of the hand of the operator as illustrated in FIG. 1. At the upper end of the handle 13, there is an upwardly extending shank portion 15 that is about twice the width of the handle 13 and is concave facing upwardly in cross section. From the top end of the shank portion 15 there projects a bifurcated tongue 16 that extends in an arcuate approximately 90° angle. The bifurcated tongue portion 16 is concave facing upwardly and bifurcations terminate at their distal ends in inturned tips 16a.

The upper member 12 has a concave upwardly facing handle portion 20 that is slidably received in the trackway on top of lower handle portion 13. The lower end of the handle portion 12 is upturned at 20a as an abutment projecting between the inturned projecting lips 13b of the lower handle member. This abutment 20a is engaged by the thumb of the operator to slidably move the upper member in the lower handle trackway. At the upper end of the handle portion 20, there extends in the same curved manner a shank portion 21 having a relatively large elongated aperture therethrough. This shank portion 21 is about twice the width of the handle portion 20 and is concave in cross section facing upwardly conforming to the like concave shank portion 15 of the lower member 11. As in the lower member 11, there is a bifurcated tongue portion 22 that projects in an approximate 90° angle curve. The bifurcation terminates in inturned tips 22a, see FIG. 3, at their distal ends. The upper tongue portion 22 is concave in cross section facing downwardly.

In a partially expanded position as in FIG. 1, the valve blades or tongues are about 2 inches apart at their distal ends while at their inner ends they are about 1 ⅜ inches apart. This speculum serves well in the preparation for an operation. The relatively large access aperture 21a permits swab entrance and inspection. The bifurcated valve or tongue portions allow greater exposure of the vaginal membrane being prepared. The handles of the speculum can be shortened if need be in which case the abutment 20a could be a projection molded further up on the upper handle portion 20. The relatively long handles keep the hand of the one preparing the patient away from the field. The use of this speculum for patient preparation is a simple maneuver by one hand without secondary levers to push and hand screws to turn thus leaving the other hand fully free for use in preparing the patient. The speculum is easily fabricated from plastic as by molding and can be economically made and can be an expendable instrument after one use. It can be packaged in a sterile condition and removed from its wrapper at time of use and after use it can be discarded.

I claim:

1. A vaginal speculum comprising:
   a lower member and an upper member;
   said lower member having a curved handle portion having a radius of the order of approximately 4 inches;
   an integral shank portion at its upper end that is approximately twice the width of the handle portion and is concave in cross section and faces upwardly from where it projects in an arcuate approximate right angle turn out from the handle portion as an integral bifurcated lower tongue portion that is concave in cross section and faces upwardly;
   said upper member having a curved handle portion having a similar radius of curvature to the lower member and slidably received thereon;
   means slidably securing the upper handle member to the lower handle member;
   said upper handle portion having an integral shank portion at its upper end overlying the lower member shank portion and of like curvature, said just-mentioned integral shank portion being approximately twice the width of the upper handle portion and concave in cross section and facing downwardly from where it projects in an arcuate approximate right angle turn overlying the adjacent bottom member portion and extends as an integral bifurcated upper tongue portion overlying the bottom member bifurcated tongue portion;
   said upper handle portion having an abutment means projecting upwardly therefrom for engagement by the thumb of the operator holding the speculum whereby the handle upper member is slid along the handle of the lower member and the two bifurcated tongue members can be moved apart with the outer end portions being spaced further apart than the inner end portions;
   said upper member shank portion having a relatively large aperture therethrough whereby the operator can look therethrough and on between the spaced apart bifurcated tongue portions.

2. A vaginal speculum according to claim 1 wherein the aperture through the shank portion of the upper member is elongated in the direction of the handle portion of the upper member.

3. A vaginal speculum according to claim 1 wherein said means slidably securing the upper handle member to the lower handle member is an inturned overlying track portion at each edge of the lower handle portion for slidably receiving the upper handle portion.

4. A vaginal speculum according to claim 3 wherein said upper member handle portion has a downwardly curved portion at its lower end for engagement by the little finger of the hand of the operator while the thumb of the hand of the operator moves in engagement with said abutment on the handle portion of the upper member.

5. A vaginal speculum according to claim 4 wherein the abutment on the handle portion of the upper member is an integral upturned portion at the lower end of the handle portion.